(12) United States Patent
Richter et al.

(10) Patent No.: US 6,935,067 B1
(45) Date of Patent: Aug. 30, 2005

(54) ICE FISHING COVER DEVICE, KIT AND METHOD OF USING

(76) Inventors: Lawrence C. Richter, 3824 Carl St., Wausau, WI (US) 54403; Peter A. Flickner, P.O. Box 94, Briggsville, WI (US) 53920

( * ) Notice: Subject to any disclaimer, the term of this patent is extended or adjusted under 35 U.S.C. 154(b) by 0 days.

(21) Appl. No.: 10/692,624

(22) Filed: Oct. 24, 2003

(51) Int. Cl.[7] ............................................. A01K 97/00
(52) U.S. Cl. ................................................... 43/4
(58) Field of Search .............................. 43/4, 17, 54.1; 206/315.11

(56) References Cited

U.S. PATENT DOCUMENTS

| | | | | |
|---|---|---|---|---|
| 2,483,787 A | * | 10/1949 | Sheraski | 432/76 |
| 3,142,847 A | * | 8/1964 | Kurrels | 4/484 |
| 3,362,564 A | * | 1/1968 | Mueller | 220/345.3 |
| 4,131,107 A | * | 12/1978 | Godbout | 126/271.2 R |

* cited by examiner

*Primary Examiner*—Teri Pham Luu
*Assistant Examiner*—Kimberly S. Smith

(57) ABSTRACT

An ice fishing hole cover device, an associated kit and an associated method of using the kit for assembling the device for use in minimizing ice formation over an existing open ice fishing hole and for use in convenient rapid disassembly of device is disclosed. The device includes the slidably interconnected elements of a pair of upper panels, a plurality of quick release locks, a pair of end panels, and a pair of side panels. The kit includes the un-interconnected elements of the device. The method includes the steps of abutting, affixing, attaching, coupling, dropping, hoisting, inserting, letting, lighting, lowering, mounting, obtaining, placing, positioning, pushing, reeling, removing, sliding, stacking, stringing, uncoupling, and wrapping.

19 Claims, 4 Drawing Sheets

ICE FISHING COVER DEVICE, KIT AND METHOD OF USING

FIELD OF THE INVENTION

The present invention relates to fishing accessories, more particularly to a kit for use in assembling and disassembly an ice fishing hole cover device for use in minimizing ice formation over an existing open ice fishing hole.

DESCRIPTION OF THE PRIOR ART

In the sport of ice fishing, the fisherman cuts a circular hole into the ice down to the water level and drops his line into the water through the hole in order to catch fish. A difficulty which the ice fisherman faces is the fact that the ice tends to re-freeze quickly, thus reducing the diameter of the hole. Some fishermen attempt to slow the re-freezing process by pouring antifreeze or cooking oil into the hole. However, these methods pollute the water and are illegal in some states.

Several types of covers to protect the hole from re-freezing are known in the prior art. Most of these devices use solar energy to heat the hole. That method has the limitations that it cannot be used at night and also has reduced effectiveness on the cloudy days which are common in winter in northern states.

A wide variety of ice fishing hole cover devices is currently available on the commercial market and an even larger number of these types of devices are known in the art of ice fishing hole cover devices, for example, the stove for ice fishing disclosed by Bryan in U.S. Pat. No. 2,677,363; the ice fishing equipment disclosed by Obernolte in U.S. Pat. No. 2,883,784; the apparatus to prevent fishing holes from freezing disclosed by Quilling in U.S. Pat. No. 3,025,852; the ice fishing hole cover disclosed by Klinkhamer in U.S. Pat. No. 5,282,333; the ice fishing system disclosed by Sanderfoot in U.S. Pat. No. 6,088,945; and the portable, collapsible ice fishing shed disclosed by Bascom and Bascom in U.S. Pat. No. D313,061.

While all of the above-described devices fulfill their respective, particular objectives and requirements, the aforementioned patents do not describe an ice fishing hole cover device having the slidably interconnected elements of a pair of upper panels, a plurality of quick release locks, a pair of end panels, and a pair of side panels. This combination of elements would specifically match the user's particular individual needs of making it possible to provide a means for rapidly assembling and disassembling an ice fishing hole cover device in order to un-encumber the fisherman when reeling in a fish through a fish hole in the ice. The above-described patents make no provision for an ice fishing hole cover device having the slidably interconnected elements of a pair of upper panels, a plurality of quick release locks, a pair of end panels, and a pair of side panels.

Therefore, a need exists for a new and improved ice fishing hole cover device having slidably interconnected elements of a pair of upper panels, a plurality of quick release locks, a pair of end panels, and a pair of side panels. In this respect, the ice fishing hole cover device according to the present invention substantially departs from the conventional concepts and designs of the prior art, and in doing so provides an apparatus primarily developed for the purpose of providing a convenient means for making it possible to rapidly assemble and disassemble an ice fishing hole cover device in order to un-encumber the fisherman when reeling in a fish through a fish hole in the ice.

SUMMARY OF THE INVENTION

The present device, kit and method of using, according to the principles of the present invention, overcomes the shortcomings of the prior art by providing a novel ice fishing hole cover device, kit and method for use in minimizing ice formation over an existing open ice fishing hole and for use in convenient rapid disassembly of device is disclosed. The device includes the slidably interconnected elements of a pair of upper panels, a plurality of quick release locks, a pair of end panels, and a pair of side panels. The kit includes the un-interconnected elements of the device. The method includes the steps of abutting, affixing, attaching, coupling, dropping, hoisting, inserting, letting, lighting, lowering, mounting, obtaining, placing, positioning, pushing, reeling, removing, sliding, stacking, stringing, uncoupling, and wrapping.

In view of the foregoing disadvantages inherent in the known type ice fishing hole cover devices now present in the prior art, the present invention provides an improved ice fishing hole cover device, which will be described subsequently in great detail, is to provide a new and improved ice fishing hole cover device which is not anticipated, rendered obvious, suggested, or even implied by the prior art, either alone or in any combination thereof.

To attain this, the present invention essentially comprises the slidably interconnected elements of a pair of upper panels, a plurality of quick release locks, a pair of end panels, and a pair of side panels.

There has thus been outlined, rather broadly, the more important features of the invention in order that the detailed description thereof that follows may be better understood, and in order that the present contribution of the art may be better appreciated.

The invention may also include strap. There are of course, additional features of the invention that will be described hereinafter and which will form the subject matter of the claims attached.

Numerous objects, features and advantages of the present invention will be readily apparent to those of ordinary skill in the art upon reading of the following detailed description of presently preferred, but nonetheless illustrative, embodiments of the present invention when taken in conjunction with the accompany drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved ice fishing hole cover device that has all the advantages of the prior art ice fishing hole cover device and none of the disadvantages.

It is another object of the present invention to provide a new and improved ice fishing hole cover device that may be easily and efficiently manufactured and marketed.

An even further object of the present invention is to provide a new and improved ice fishing hole cover device that has a low cost of manufacture with regard to both materials and labor, and which accordingly is then susceptible of low prices of sale to the consuming public, thereby making such multipurpose storage unit and system economically available to the buying public.

Still another object of the present invention is to provide a new ice fishing hole cover device that provides in the apparatuses and methods of the prior art some of the advantages thereof, while simultaneously overcoming some of the disadvantages normally associated therewith.

Even still another object of the present invention is to provide a ice fishing hole cover device having the slidably interconnected elements of a pair of upper panels, a plurality of quick release locks, a pair of end panels, and a pair of side panels. This combination of elements makes it possible to rapidly assemble and disassemble an ice fishing hole cover device in order to un-encumber the fisherman when reeling in a fish through a fish hole in the ice.

Still another object of the present invention is to provide a kit comprising the un-interconnected elements of the device.

Lastly, it is an object of the present invention to provide a new and improved method of using comprising the steps of abutting, affixing, attaching, coupling, dropping, hoisting, inserting, letting, lighting, lowering, mounting, obtaining, placing, positioning, pushing, reeling, removing, sliding, stacking, stringing, uncoupling, and wrapping.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and description matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE PREFERRED EMBODIMENT

Figure 1:
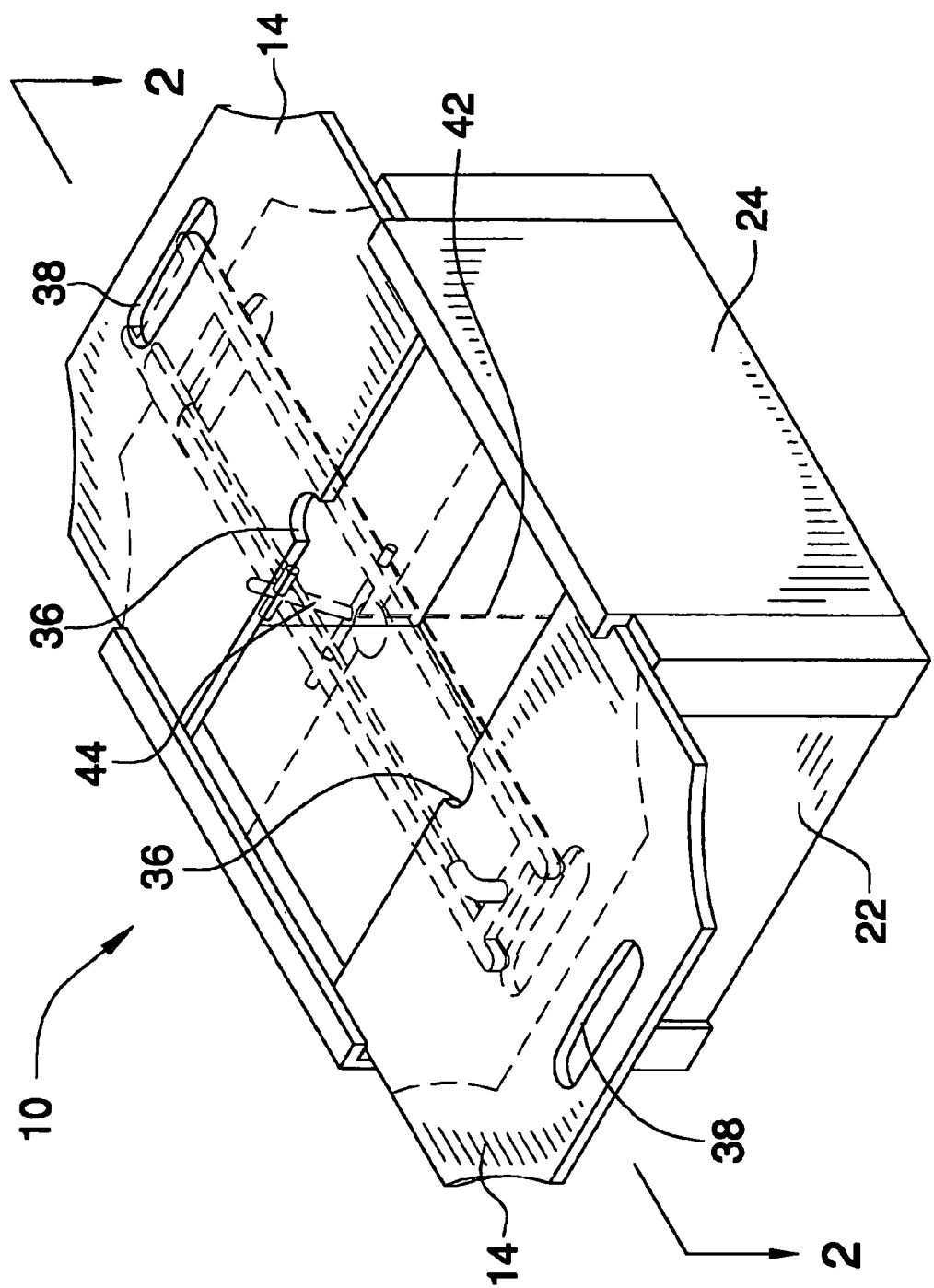
FIG. 1 is a perspective view of an assembled preferred embodiment of the ice fishing hole cover device constructed in accordance with the principles of the present invention.

Referring now to the drawings, and in particular FIGS. 1 to 5 thereof, one preferred embodiment of the present invention is shown and generally designated by the reference numeral 10. One preferred embodiment of an ice fishing hole cover device 10 for use in minimizing ice formation over an existing open ice fishing hole 12 and for use in convenient rapid disassembly of the device 10, the device 10 comprising: a pair of upper panels 14, a plurality of quick release locks 16, a pair of end panels 22, and a pair of side panels 24. Each upper panel 14 has a generally rectangular shape with two opposing horizontal side edges, an inside edge, and an outside edge, wherein the horizontal side edges of each upper panel 14 are substantially parallel to each other, in which each horizontal side edge of each upper panel 14 has a width. Each lock 16 comprising a first part and a complementary matching second part, wherein the first and second parts of each lock 16 are releaseably interlocked together. Each end panel 22 has a generally rectangular shape with two vertical edges and two horizontal edges, wherein each vertical edge of each end panel 22 has a width and has at least one of the first parts of the plurality of locks 16 attached to each vertical edge of each end panel 22, whereby each end panel 22 has at least two of the first parts of the plurality of locks 16 attached to each end panel 22. The pair of side panels 24 are slidably attached to the pair of end panels 22 and slidably attached to the pair of upper panels 14 forming the device 10, in which the device 10 has a centrally disposed hollow chamber. Each side panel 24 has a generally rectangular shape, in which each side panel 24 includes a pair of vertical dados 26 and a horizontal dado 28. The pair of vertical dados 26 are entrenched into opposing vertical side edges in a common face of each side panel 24, in which the pair of vertical dados 26 in each side panel 24 are substantially parallel to each other, wherein each vertical dado 26 has a width equal to or greater than the width of each vertical edge of each end panel 22. Each vertical dado 26 also has at least one of the second parts of the plurality of locks 16 attached to each vertical dado 26, whereby each side panel 24 has at least two of the second parts of the plurality of locks 16. The horizontal dado 28 is entrenched into a horizontal top edge into the common face of each side panel 24, in which the horizontal dado 28 of each side panel 24 is substantially perpendicular to the pair of vertical dados 26 of each side panel 24, wherein the horizontal dado 28 of each side panel 24 has a width equal to or greater than the width of each horizontal side edge of each upper panel 14. When the pair of side panels 24 are slidably attached to the pair of end panels 22 then the first and second parts of each lock 16 of the plurality of locks 16 are interlocked together.

An optional candle holder 30 may be added to the device 10 which is mounted within the centrally disposed hollow chamber of the device 10.

An optional candle 32 may be added to the device 10 which is mounted within the centrally disposed hollow chamber of the device 10.

An optional strap 34 may be added to the device 10 which is attached around the device 10.

The shape and design configuration of the inside edge of each upper panel 14 may have any shape and design. One preferred configuration of the inside edge of each upper panel 14 has a concave sleeve 36 attached to each inside edge of each upper panel 14, when the inside edges of the pair of upper panels 14 are abutted together then the concave sleeves 36 of the inside edges of the upper panel 14 define a fish line orifice extending into the centrally disposed hollow chamber of the device 10.

The shape and design configuration of the outside edge of each upper panel 14 may have any shape and design. One preferred configuration of the outside edge of each upper panel 14 has an arcuate curved collar 38 traversing through the outside edge of each upper panel 14, the arcuate curved collar 38 defining a handgrip in each upper panel 14.

The plurality of quick release locks 16 may be any commercially known locks 16 as long as they are able to allow a user to quickly assemble and disassemble the device 10. One preferred configuration of each lock 16 comprises that the first part of each lock 16 of the plurality of quick release locks 16 comprises a male dimple protrusion 18, and each second part of each lock 16 of the plurality of quick release locks 16 comprises a complementary female dimple crevice 20. Another preferred configuration of each lock 16 comprises each first part of each lock 16 of the plurality of quick release locks 16 comprises a female dimple crevice 20, and each second part of each lock 16 of the plurality of quick release locks 16 comprises a complementary male dimple protrusion 18.

The strap 34 may be any commercially available strap 34 such as those selected form the group consisting of an elastic band, a rope, a string, a cotton cord, a jute cord, a leather belt, and a nylon cord.

The panels of the device 10 may be made of any sturdy material. One preferred configuration of the panels of the device are made from a polymeric material selected from the group consisting of polyvinyl chloride, polyester, polypropylene, polyurethanes, polyacryls, polymethacryls, cellulosic polymers, styrene-acryl copolymers, polystyrene-polyacryl mixtures, polysiloxanes, urethane-acryl copolymers, siloxane-urethane copolymers, polyurethane-polymethacryl mixtures, silicone-acryl copolymers, vinyl acetate polymers, and mixtures thereof. Another preferred configuration of the panels are made of wood selected from the group consisting of ash, aspen, birch, elm, fir, locust, maple, oak, pine, and walnut.

Another preferred embodiment of the device 10 consist essentially of a pair of upper panels 14, a plurality of quick release locks 16, a pair of end panels 22, and a pair of side panels 24.

One preferred embodiment of a kit 40 for assembling an ice fishing hole 12 cover device 10 comprises: a pair of upper panels 14, a plurality of quick release locks 16, a pair of end panels 22, and a pair of side panels 24. The each upper panel 14 of the pair of upper panels 14 has a generally rectangular shape with two opposing horizontal side edges, an inside edge, and an outside edge. The horizontal side edges of each upper panel 14 are substantially parallel to each other, wherein each horizontal side edge of each upper panel 14 having a width. Each lock 16 of the plurality of quick release locks 16 comprises a first part and a complementary matching second part, wherein the first and second parts of each lock 16 are releaseably interlockable together. Each end panel 22 of the pair of end panels 22 has a generally rectangular shape with two vertical edges and two horizontal edges, in which each vertical edge of each end panel 22 has a width and has at least one of the first parts of the plurality of locks 16 attached to each vertical edge of each end panel 22, whereby each end panel 22 has at least two of the first parts of the plurality of locks 16 attached to each end panel 22. Each side panels 24 of the pair of side panels 24 is slidably attachable to the pair of end panels 22 and is slidably attachable to the pair of upper panels 14, wherein when the pair of side panels 24 are slidably attached to the pair of end panels 22 and slidably attached to the pair of upper panels 14 then the kit 40 forms the device 10 having a centrally disposed hollow chamber. Each side panel 24 has a generally rectangular shape, in which each side panel 24 includes: a pair of vertical dados 26 and a horizontal dado 28. The pair of vertical dados 26 is entrenched into opposing vertical side edges in a common face of each side panel 24, the pair of vertical dados 26 in each side panel 24 are substantially parallel to each other, each vertical dado 26 having a width equal to or greater than the width of each vertical edge of each end panel 22, each vertical dado 26 having at least one of the second parts of the plurality of locks 16 attached to each vertical dado 26, whereby each side panel 24 having at least two of the second parts of the plurality of locks 16. The horizontal dado 28 is entrenched into a horizontal top edge into the common face of each side panel 24, the horizontal dado 28 of each side panel 24 is substantially perpendicular to the pair of vertical dados 26 of each side panel 24, the horizontal dado 28 of each side panel 24 having a width equal to or greater than the width of each horizontal side edge of each upper panel 14. When the pair of side panels 24 are slidably attached to the pair of end panels 22 then the first and second parts of each lock 16 of the plurality of locks 16 are interlocked together.

An optional candle holder 30 may be added to the kit 40.

An optional candle 32 may be added to the kit 40.

An optional strap 34 may be added to the kit 40 which may be wrapped around the pair of upper panels 14, the pair of end panels 22, and the pair of side panels 24.

The inside edge of each upper panel 14 of the kit 40 may have a concave sleeve 36 attached to each inside edge of each upper panel 14, when the inside edges of the pair of upper panels 14 are abutted together then the concave sleeves 36 of the inside edges of the upper panel 14 define a fish line orifice extending into the centrally disposed hollow chamber of the device 10.

The outside edge of each upper panel 14 of the kit 40 may have an arcuate curved collar 38 traversing through the outside edge of each upper panel 14, the arcuate curved collar 38 defining a handgrip in each upper panel 14.

The plurality of quick release locks 16 of the kit 40 may comprise any known locking means. One preferred configuration of the plurality of quick release locks 16 is that each first part of each lock 16 of the plurality of quick release locks 16 comprises a male dimple protrusion 18, and each second part of each lock 16 of the plurality of quick release locks 16 comprises a complementary female dimple crevice 20. Another preferred configuration of the plurality of quick release locks 16 is that each first part of each lock 16 of the plurality of quick release locks 16 comprises a female dimple crevice 20, and each second part of each lock 16 of the plurality of quick release locks 16 comprises a complementary male dimple protrusion 18.

Another preferred embodiment of a kit 40 for assembling an ice fishing hole 12 cover device 10 consist essentially of:

a pair of upper panels 14, a plurality of quick release locks 16, a pair of end panels 22, and a pair of side panels 24.

One preferred embodiment of a method of using a kit 40 for assembling an ice fishing hole 12 cover device 10 for use in minimizing ice formation over an existing open ice fishing hole 12 and for use in convenient rapid disassembly of the device 10, the method comprising the steps of abutting, affixing, attaching, coupling, dropping, hoisting, inserting, letting, lighting, lowering, mounting, obtaining, placing, positioning, pushing, reeling, removing, sliding, stacking, stringing, uncoupling, and wrapping. The obtaining step comprises obtaining the kit 40 comprising: a pair of upper panels 14, each upper panel 14 having a generally rectangular shape with two opposing horizontal side edges, an inside edge, and an outside edge, the horizontal side edges of each upper panel 14 are substantially parallel to each other, each horizontal side edge of each upper panel 14 having a width, wherein the inside edge of each upper panel 14 having a concave sleeve 36 attached to each inside edge of each upper panel 14, when the inside edges of the pair of upper panels 14 are abutted together then the concave sleeves 36 of the inside edges of the upper panel 14 define a fish line orifice extending into the centrally disposed hollow chamber of the device 10, wherein the outside edge of each upper panel 14 having an arcuate curved collar 38 traversing through the outside edge of each upper panel 14, the arcuate curved collar 38 defining a handgrip in each upper panel 14; a plurality of quick release locks 16, each lock 16 comprising a first part and a complementary matching second part, wherein the first and second parts of each lock 16 are releaseably interlockable together; a pair of end panels 22, each end panel 22 having a generally rectangular shape with two vertical edges and two horizontal edges, each vertical edge of each end panel 22 having a width and having at least one of the first parts of the plurality of locks 16 attached to each vertical edge of each end panel 22, whereby each end panel 22 having at least two of the first parts of the plurality of locks 16 attached to each end panel 22; a pair of side panels 24 slidably attachable to the pair of end panels 22 and slidably attachable to the pair of upper panels 14, wherein when the pair of side panels 24 are slidably attached to the pair of end panels 22 and slidably attached to the pair of upper panels 14 then the kit 40 forms the device 10 having a centrally disposed hollow chamber, each side panel 24 having a generally rectangular shape, each side panel 24 including: a pair of vertical dados 26 entrenched into opposing vertical side edges in a common face of each side panel 24, the pair of vertical dados 26 in each side panel 24 are substantially parallel to each other, each vertical dado 26 having a width equal to or greater than the width of each vertical edge of each end panel 22, each vertical dado 26 having at least one of the second parts of the plurality of locks 16 attached to each vertical dado 26, whereby each side panel 24 having at least two of the second parts of the plurality of locks 16; and a horizontal dado 28 entrenched into a horizontal top edge into the common face of each side panel 24, the horizontal dado 28 of each side panel 24 is substantially perpendicular to the pair of vertical dados 26 of each side panel 24, the horizontal dado 28 of each side panel 24 having a width equal to or greater than the width of each horizontal side edge of each upper panel 14, wherein when the pair of side panels 24 are slidably attached to the pair of end panels 22 then the first and second parts of each lock 16 of the plurality of locks 16 are interlocked together; a candle holder 30; a candle 32; and a strap 34. The stacking step comprises stacking together the pair of upper panels 14, the pair of end panels 22, and the pair of side panels 24 to form a stack of panels when the pair of upper panels 14 are next to each other so that each handgrip of each upper panel 14 of the pair of upper panels 14 is adjacent to each other. The wrapping step comprises wrapping the strap 34 around the stack of panels and through each handgrip to form a wrapped panel package. The hoisting step comprises hoisting the wrapped panel package to an area near the existing open ice fishing hole 12. The removing step comprises removing the strap 34 wrapped around the stack of panels. The coupling step comprises coupling slidably together the vertical edges of the pair of end panels 22 into the vertical dados 26 of the pair of side panels 24 to form a generally rectangular walled structure. The pushing step comprises pushing together the pair of side panels 24 coupled to the pair of end panels 22 to lock 16 together the plurality of locks 16. The inserting step comprises inserting slidably the two opposing horizontal side edges of each upper panel 14 into the horizontal dados 28 of the pair of side panels 24 of the locked rectangular walled structure to form the device 10. The placing step comprises placing the device 10 over the existing open ice fishing hole 12. The step comprises dropping a fishing line 42 through the centrally disposed hollow chamber of the device 10 and into the existing open ice fishing hole 12. The step comprises affixing together the candle 32 to the candle holder 30. The step comprises lighting the candle 32 affixed to the candle holder 30 with a flame. The step comprises positioning the burning candle 32 affixed to the candle holder 30 within the centrally disposed hollow chamber of the device 10 onto ice near the ice fishing hole 12. The step comprises abutting together the inside edges of the upper panels 14 together to form the fish line orifice extending into the centrally disposed hollow chamber of the device 10. The step comprises stringing the fishing line 42 through the fish line orifice. The step comprises attaching a spring flag apparatus 44 to the fishing line 42. The step comprises mounting pivotally the spring flag apparatus 44 on top of the device 10 over the fish line orifice of the device 10. The lowering step comprises lowering pivotally the mounted spring flag apparatus 44. The letting step comprises letting the spring flag apparatus 44 to pivotally raise up when a fish gets hooked onto the fishing line 42 and subsequently pulls on the fishing fine 42. The sliding step comprises sliding off the upper panels 14 from the device 10. The uncoupling step comprises uncoupling slidably the pair of side panels 24 away from the pair of end panels 22, wherein the steps of sliding and uncoupling result in unassembling the device 10 from over the existing open ice fishing hole 12. The reeling step comprises reeling in the hooked fish from existing open ice fishing hole 12 subsequent to the steps of sliding and uncoupling.

Another preferred embodiment of a method consist essentially of the steps of: abutting, affixing, attaching, coupling, dropping, hoisting, inserting, letting, lighting, lowering, mounting, obtaining, placing, positioning, pushing, reeling, removing, sliding, stacking, stringing, uncoupling, and wrapping.

Referring now to FIG. 1 which depicts a perspective view of an assembled preferred embodiment of the ice fishing hole cover device 10 showing a pair of upper panels 14, a pair of end panels 22, and a pair of side panels 24, in which all are slidably interconnected together. Each upper panel 14 of the device 10 is shown slidably engaged within the horizontal dados of the two side panels. The inside edge of each upper panel 14 is shown having a concave sleeve 36, in which when the inside edges of both upper panels 14 are abutted together the concave sleeves define a fish line orifice which allows access into the centrally disposed hollow chamber of the device 10. The outside edge of each upper panel 14 is shown having an arcuate curved collar 38 traversing through the outside edge of each upper panel 14, in which each arcuate curved collar 38 is shown defining a handgrip in each upper panel 14. An end panel 22 is shown slidably engaged within vertical dados 26 of the two side panels 24. Also shown is a spring flag apparatus mounted on the device 10 and a fishing line 42 suspended from the spring flag apparatus 44 through the fish line orifice into the centrally disposed hollow chamber within the device 10.

Figure 2:
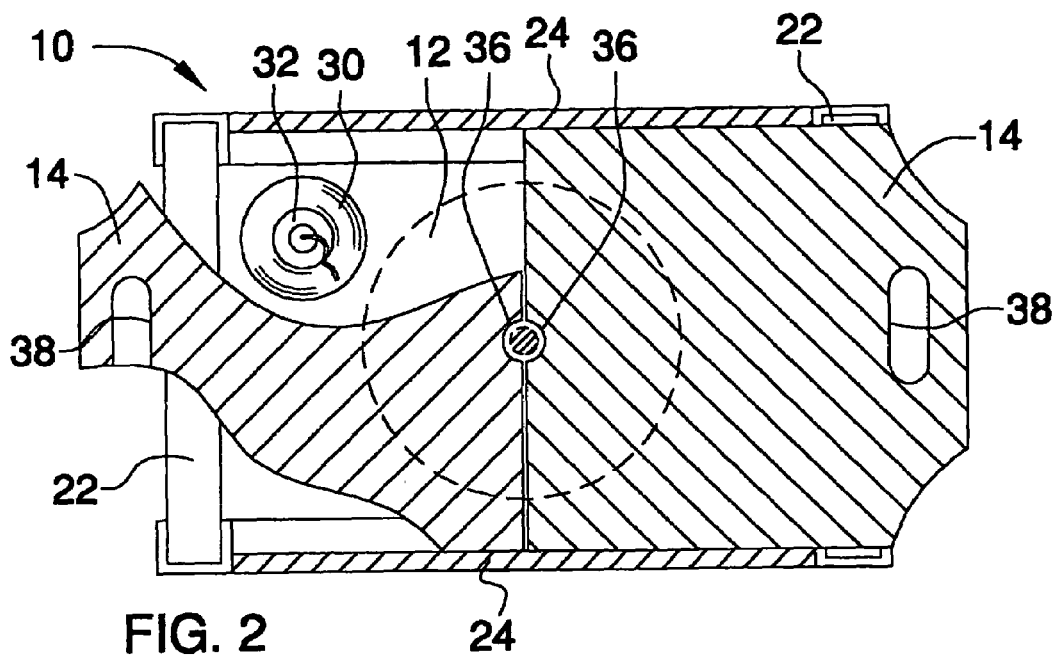
FIG. 2 is a top cutaway view of an assembled preferred embodiment of the ice fishing hole cover device of the present invention.

Referring now to FIG. 2 which depicts a top cutaway view of an assembled preferred embodiment of the ice fishing hole cover device 10 showing the pair of upper panels 14, a pair of end panels 22, and a pair of side panels 24, in which all are slidably interconnected together. Each upper panel 14 of the device 10 is shown slidably engaged with the two side panels. The inside edge of both upper panels 14 are shown abutted showing the concave sleeves 36 forming a fish line orifice which allows access into the centrally disposed hollow chamber of the device 10. The outside edge of each upper panel 14 is shown having an arcuate curved collar 38 traversing through the outside edge of each upper panel 14, in which each arcuate curved collar 38 is shown defining a handgrip in each upper panel 14. Each end panel 22 is shown slidably engaged within vertical dados 26 of the two opposing side panels 24. Also shown is a candle holder 30 holding a candle 34. Also shown is a fish ice hole.

Figure 3:
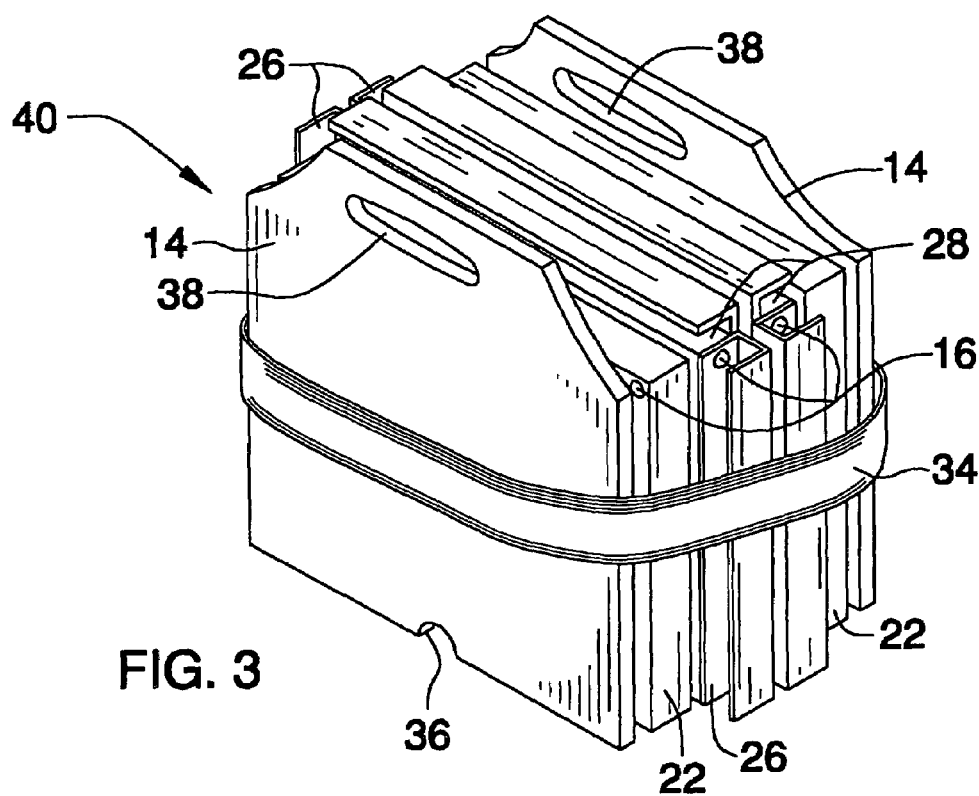
FIG. 3 is a perspective view of a stacked kit of a preferred embodiment of the ice fishing hole cover device of the present invention.

Referring now to FIG. 3 is a perspective view of a preferred embodiment of a kit 40 for a ice fishing hole cover device 10 showing a pair of upper panels 14, a pair of end panels 22, and a pair of side panels 24 wrapped together with a strap 34. The pair of side panels 24 are shown having vertical dados 26 which have at least one of the second parts of the plurality of locks 16 attached to each vertical dado 26.

Figure 4:
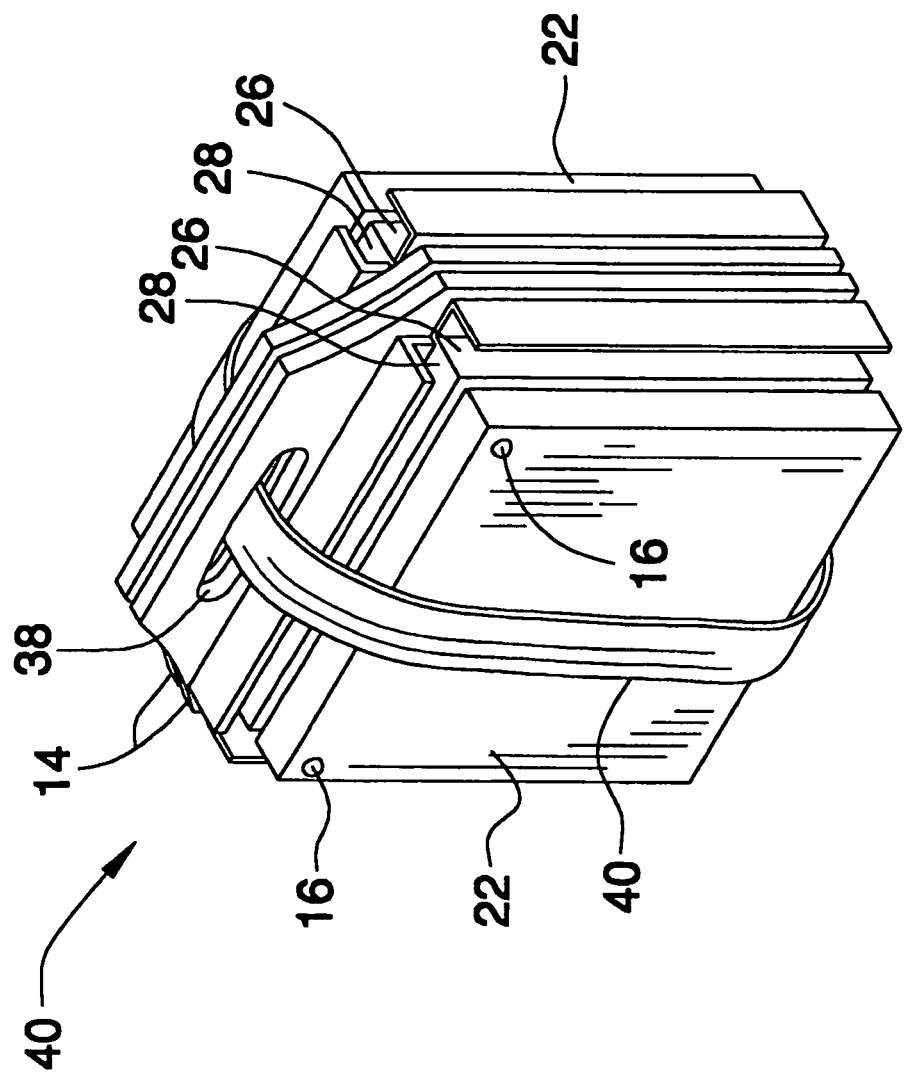
FIG. 4 is a perspective view of a stacked kit of a preferred embodiment of the ice fishing hole cover device of the present invention.
Figure 5:
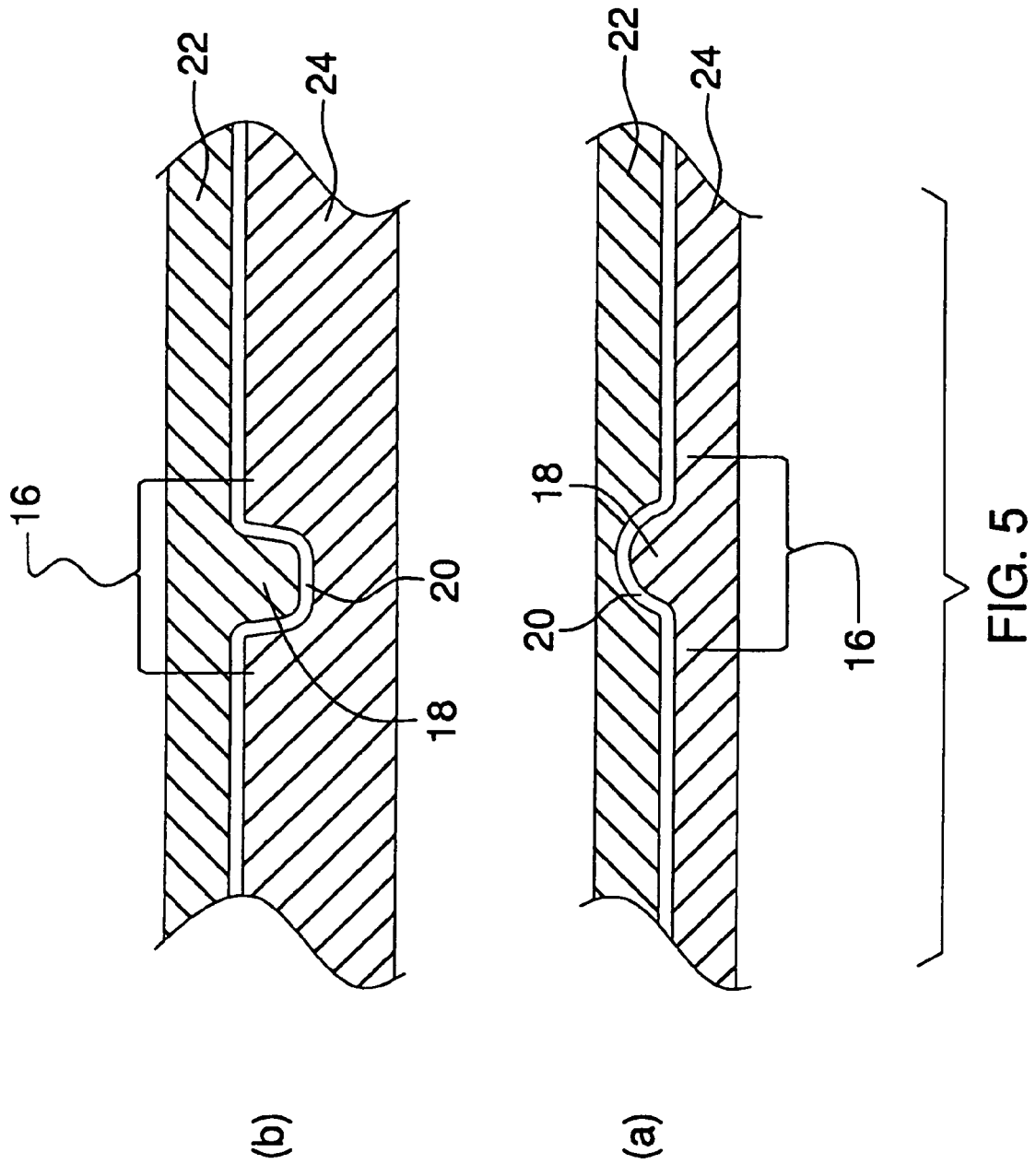
FIG. 5 is a closeup cross sectional partial view of an end panel locked together with a side panel.

Referring now to FIG. 4 is a perspective view a preferred embodiment of a kit 40 for a ice fishing hole cover device 10 showing a pair of upper panels 14, a pair of end panels 22, and a pair of side panels 24 wrapped together with a strap 34. One end panels 22 is shown having on each vertical edge of the end panel 22 at least one of the first part of the plurality of locks 16 attached to each vertical edge of each end panel 22.

Referring now to FIG. 5*a* which depicts a closeup cross sectional partial view of a preferred embodiment of a quick release lock 16 attached to the end panel 22 and the side panel 24. The first part of the lock 16 is shown to be a female dimple crevice 20 attached to the end panel 22, and the corresponding second part of the lock 16 is shown to be a complementary male dimple protrusion 18 attached to the side panel 24.

Referring now to FIG. 5*b* which depicts closeup cross sectional partial view of another preferred embodiment of a quick release lock 16 attached to the end panel 22 and the side panel 24. The first part of the lock 16 is shown to be a male dimple protrusion 18 attached to the end panel 22 and the corresponding second part of the lock 16 is shown to be a complementary female dimple crevice 20 attached to the side panel 24.

As to the manner of usage and operation of the present invention, the same should be apparent from the above description. Accordingly, no further discussion relating to the manner of usage and operation will be provided.

While a preferred embodiment of the ice fishing hole cover device has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Throughout this specification, unless the context requires otherwise, the word "comprise" or variations such as "comprises" or "comprising" or the term "includes" or variations, thereof, or the term "having" or variations, thereof will be understood to imply the inclusion of a stated element or integer or group of elements or integers but not the exclusion of any other element or integer or group of elements or integers. In this regard, in construing the claim scope, an embodiment where one or more features is added to any of the claims is to be regarded as within the scope of the invention given that the essential features of the invention as claimed are included in such an embodiment.

Those skilled in the art will appreciate that the invention described herein is susceptible to variations and modifications other than those specifically described. It is to be understood that the invention includes all such variations and modification which fall within its spirit and scope. The invention also includes all of the steps, features, compositions and compounds referred to or indicated in this specification, individually or collectively, and any and all combinations of any two or more of said steps or features.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the Unites States is as follows:

1. An ice fishing hole cover device for use in minimizing ice formation over an existing open ice fishing hole and for use in convenient rapid disassembly of said device, said device comprising:
   a pair of upper panels, each upper panel having a generally rectangular shape with two opposing horizontal side edges, an inside edge, and an outside edge, said horizontal side edges of each upper panel are substantially parallel to each other, each horizontal side edge of each upper panel having a width;
   a plurality of quick release locks, each lock comprising a first part and a complementary matching second part, wherein said first and second parts of each lock are releaseably interlocked together;
   a pair of end panels, each end panel having a generally rectangular shape with two vertical edges and two horizontal edges, each vertical edge of each end panel having a width and having at least one of said first parts of said plurality of locks attached to each vertical edge of each end panel, whereby each end panel having at least two of said first parts of said plurality of locks attached to each end panel; and
   a pair of side panels slidably attached to said pair of end panels and slidably attached to said pair of upper panels forming said device having a centrally disposed hollow chamber, each side panel having a generally rectangular shape, each side panel including:
      a pair of vertical dados entrenched into opposing vertical side edges in a common face of each side panel, said pair of vertical dados in each side panel are substantially parallel to each other, each vertical dado having a width equal to or greater than the width of each vertical edge of each end panel, each vertical dado having at least one of said second parts of said plurality of locks attached to each vertical dado, whereby each side panel having at least two of said second parts of said plurality of locks; and a horizontal dado entrenched into a horizontal top edge into the common face of each side panel, said horizontal dado of each side panel is substantially perpendicular to said pair of vertical dados of each side panel, said horizontal dado of each side panel having a width equal to or greater than the width of each horizontal side edge of each upper panel;

wherein when said pair of side panels are slidably attached to said pair of end panels then said first and second parts of each lock of said plurality of locks are interlocked together.

2. The device of claim 1 further comprising a candle holder mounted within the centrally disposed hollow chamber of said device.

3. The device of claim 1 further comprising a candle mounted within the centrally disposed hollow chamber of said device.

4. The device of claim 1 wherein said inside edge of each upper panel has a concave sleeve attached to each inside edge of each upper panel, when said inside edges of said pair of upper panels are abutted together then said concave sleeves of said inside edges of said upper panel define a fish line orifice extending into the centrally disposed hollow chamber of said device.

5. The device of claim 1 wherein said outside edge of each upper panel having an arcuate curved collar traversing through said outside edge of each upper panel, said arcuate curved collar defining a handgrip in each upper panel.

6. The device of claim 1 wherein each first part of each lock of said plurality of quick release locks comprises a male dimple protrusion, and each second part of each lock of said plurality, of quick release locks comprises a complementary female dimple crevice.

7. The device of claim 1 wherein each first part of each lock of said plurality of quick release locks comprises a female dimple crevice, and each second part of each lock of said plurality of quick release locks comprises a complementary male dimple protrusion.

8. The device of claim 1 wherein said panels are made from a polymeric material selected from the group consisting of polyvinyl chloride, polyester, polypropylene, polyurethanes, polyacryls, polymethacryls, cellulosic polymers, styrene-acryl copolymers, polystyrene-polyacryl mixtures, polysiloxanes, urethane-acryl copolymers, siloxane-urethane copolymers, polyurethane-polymethacryl mixtures, silicone-acryl copolymers, vinyl acetate polymers, and mixtures thereof.

9. The device of claim 1 wherein said panels are made of wood selected from the group consisting of ash, aspen, birch, elm, fir, locust, maple, oak, pine, and walnut.

10. A kit for assembling an ice fishing hole cover device for use in minimizing ice formation over an existing open ice fishing hole and for use in convenient rapid disassembly of the device, said kit comprising:

a pair of upper panels, each upper panel having a generally rectangular shape with two opposing horizontal side edges, an inside edge, and an outside edge, said horizontal side edges of each upper panel are substantially parallel to each other, each horizontal side edge of each upper panel having a width;

a plurality of quick release locks, each lock comprising a first part and a complementary matching second part, wherein said first and second parts of each lock are releaseably interlockable together;

a pair of end panels, each end panel having a generally rectangular shape with two vertical edges and two horizontal edges, each vertical edge of each end panel having a width and having at least one of said first parts of said plurality of locks attached to each vertical edge of each end panel, whereby each end panel having at least two of said first parts of said plurality of locks attached to each end panel; and a pair of side panels slidably attachable to said pair of end panels and slidably attachable to said pair of upper panels, wherein when said pair of side panels are slidably attached to said pair of end panels and slidably attached to said pair of upper panels then said kit forms the device having a centrally disposed hollow chamber, each side panel having a generally rectangular shape, each side panel including:

a pair of vertical dados entrenched into opposing vertical side edges in a common face of each side panel, said pair of vertical dados in each side panel are substantially parallel to each other, each vertical dado having a width equal to or greater than the width of each vertical edge of each end panel, each vertical dado having at least one of said second parts of said plurality of locks attached to each vertical dado, whereby each side panel having at least two of said second parts of said plurality of locks; and a horizontal dado entrenched into a horizontal top edge into the common face of each side panel, said horizontal dado of each side panel is substantially perpendicular to said pair of vertical dados of each side panel, said horizontal dado of each side panel having a width equal to or greater than the width of each horizontal side edge of each upper panel;

wherein when said pair of side panels are slidably attached to said pair of end panels then said first and second parts of each lock of said plurality of locks are interlocked together.

11. The kit of claim 10 further comprising a candleholder.

12. The kit of claim 10 further comprising a candle.

13. The kit of claim 10 further comprising a strap attached around said kit.

14. The kit of claim 13 wherein said strap is selected form the group consisting of an elastic band, a rope, a string, a cotton cord, a jute cord, a leather belt, and a nylon cord.

15. The kit of claim 10 further comprising a strap wrapped around said pair of upper panels, said pair of end panels, and said pair of side panels.

16. The kit of claim 10 wherein said inside edge of each upper panel having a concave sleeve attached to each inside edge of each upper panel, when said inside edges of said pair of upper panels are abutted together then said concave sleeves of said inside edges of said upper panel define a fish line orifice extending into the centrally disposed hollow chamber of said device.

17. The kit of claim 10 wherein said outside edge of each upper panel having an arcuate curved collar traversing through said outside edge of each upper panel, said arcuate curved collar defining a handgrip in each upper panel.

18. The kit of claim 10 wherein each first part of each lock of said plurality of quick release locks comprises a male dimple protrusion, and each second part of each lock of said plurality of quick release locks comprises a complementary female dimple crevice.

19. The kit of claim 10 wherein each first part of each lock of said plurality of quick release locks comprises a female dimple crevice, and each second part of each lock of said plurality of quick release locks comprises a complementary male dimple protrusion.

\* \* \* \* \*